United States Patent
Jain et al.

(10) Patent No.: US 12,073,806 B2
(45) Date of Patent: Aug. 27, 2024

(54) REFRESHING DISPLAYS USING ON-DIE CACHE

(71) Applicants: ADVANCED MICRO DEVICES, INC., Santa Clara, CA (US); ATI TECHNOLOGIES ULC, Markham (CA)

(72) Inventors: Ashish Jain, Austin, TX (US); Dhirendra Partap Singh Rana, Markham (CA); Samuel Naffziger, Fort Collins, CO (US); Gia Tung Phan, Markham (CA); Benjamin Tsien, Santa Clara, CA (US)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/134,770

(22) Filed: Dec. 28, 2020

(65) Prior Publication Data
US 2022/0130342 A1    Apr. 28, 2022

Related U.S. Application Data

(60) Provisional application No. 63/106,124, filed on Oct. 27, 2020.

(51) Int. Cl.
*G09G 3/36* (2006.01)
*G06F 1/3234* (2019.01)
*G06F 12/0811* (2016.01)
*G06F 12/0895* (2016.01)
*G09G 3/20* (2006.01)

(52) U.S. Cl.
CPC ......... *G09G 3/3618* (2013.01); *G06F 1/3265* (2013.01); *G06F 12/0811* (2013.01); *G06F 12/0895* (2013.01); *G09G 3/2092* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2006/0259804 A1* | 11/2006 | Fry | ........................ | G06F 1/3225 713/324 |
| 2007/0109292 A1* | 5/2007 | Dahan | .................... | G09G 5/363 345/211 |
| 2008/0143695 A1* | 6/2008 | Juenemann | ............... | G09G 5/39 345/204 |
| 2014/0337649 A1* | 11/2014 | Biswas | ................... | G09G 5/393 713/323 |
| 2015/0248741 A1* | 9/2015 | Iranli | ........................ | G06T 1/60 345/557 |

(Continued)

OTHER PUBLICATIONS

Definition of indication, 2023, Cambridge Dictionary, https://dictionary.cambridge.org/us/dictionary/english/indication, p. 1 (Year: 2023).*

(Continued)

*Primary Examiner* — Kirk W Hermann

(57) ABSTRACT

Refreshing displays using on-die cache, including: determining that a static display condition has been met; storing, in cache memory of a processor, first display data; and displaying the first display data from the cache memory.

20 Claims, 6 Drawing Sheets

(56) References Cited

U.S. PATENT DOCUMENTS

2016/0267883 A1\* 9/2016 Bibikar ................ G06F 1/3218
2016/0358303 A1\* 12/2016 Juliano ................ G09G 5/395
2017/0228208 A1\* 8/2017 Sirpal .................. G06F 3/0346
2021/0097640 A1\* 4/2021 Akiyama ............... G09G 5/397

OTHER PUBLICATIONS

International Search Report and Written Opinion, PCT/US2021/051084, Dec. 3, 2021, 17 pages.

\* cited by examiner

Apparatus 100

Determine That A Static Display Condition Has Been Met 202

Store, In Cache Memory Of A Processor, First Display Data 204

Display The First Display Data From The Cache Memory 206

FIG. 2

REFRESHING DISPLAYS USING ON-DIE CACHE

CROSS-REFERENCE TO RELATED APPLICATION

This application is a non-provisional application for patent entitled to a filing date and claiming the benefit of earlier-filed U.S. Provisional Patent Application Ser. No. 63/106,124, filed Oct. 27, 2020.

BACKGROUND

When a display is in a static screen state, the display still needs to be refreshed periodically. Typically, to refresh the display, display data is loaded from memory by a display controller and presented on the display. Where a memory subsystem is in an idle, low power state due to system or user inactivity, the memory subsystem must be awoken in order to load the display data. Accordingly, the memory subsystem is likely to see reduced power savings afforded by entering a low power state due to the difficulty in entering or staying in the low power state.

BRIEF DESCRIPTION OF THE DRAWINGS

FIG. 2 is a flowchart of an example method for refreshing displays using on-die cache according to some embodiments.

DETAILED DESCRIPTION

Figure 1:
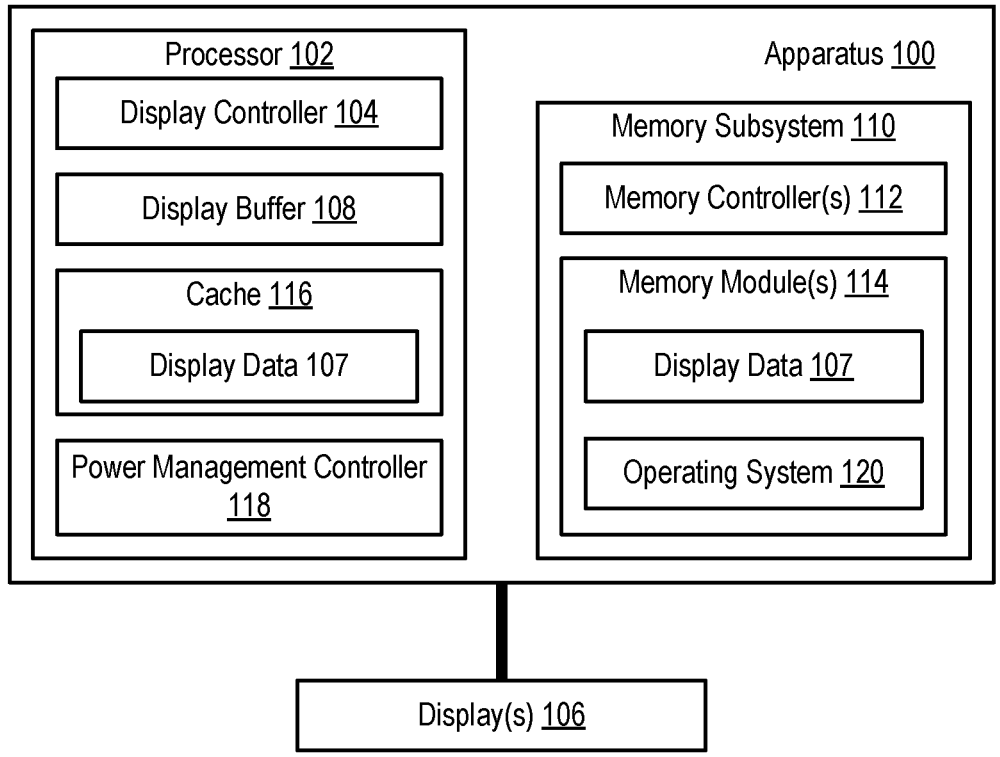
FIG. 1 is a block diagram of an example apparatus for refreshing displays using on-die cache according to some embodiments.

In some embodiments, a method of refreshing displays using on-die cache includes: determining that a static display condition has been met; storing, in cache memory of a processor, first display data; and displaying the first display data from the cache memory.

In some embodiments, determining that a static display condition has been met includes: determining that a static image is to be displayed; and determining that one or more clients of a memory subsystem are idle. In some embodiments, the cache memory includes last level cache (LLC) memory. In some embodiments, the method further includes causing a memory subsystem to enter a reduced-power state. In some embodiments, determining that a static display condition has been met is performed by an operating system, and the method further include sending, by the operating system to the processor, an indication to that the static display condition has been met. In some embodiments, the method further includes: determining that that the static display condition is no longer met; loading second display data from memory; and displaying the second display data. In some embodiments, the method further includes loading the first display data from memory.

In some embodiments, an apparatus for refreshing displays using on-die cache, performs steps including: determining that a static display condition has been met; storing, in cache memory of a processor, first display data; and displaying the first display data from the cache memory.

In some embodiments, determining that a static display condition has been met includes: determining that a static image is to be displayed; and determining that one or more clients of a memory subsystem are idle. In some embodiments, the cache memory includes last level cache (LLC) memory. In some embodiments, the steps further include causing a memory subsystem to enter a reduced-power state. In some embodiments, determining that a static display condition has been met is performed by an operating system, and the steps further include sending, by the operating system to the processor, an indication to that the static display condition has been met. In some embodiments, the steps further include: determining that that the static display condition is no longer met; loading second display data from memory; and displaying the second display data. In some embodiments, the steps further include loading the first display data from memory.

In some embodiments, a computer program product disposed upon a non-transitory computer readable medium stores computer program instructions for refreshing displays using on-die cache that, when executed, cause a computer system to perform steps including: determining that a static display condition has been met; storing, in cache memory of a processor, first display data; and displaying the first display data from the cache memory.

In some embodiments, determining that a static display condition has been met includes: determining that a static image is to be displayed; and determining that one or more clients of a memory subsystem are idle. In some embodiments, the cache memory includes last level cache (LLC) memory. In some embodiments, the steps further include causing a memory subsystem to enter a reduced-power state. In some embodiments, determining that a static display condition has been met is performed by an operating system, and the steps further include sending, by the operating system to the processor, an indication to that the static display condition has been met. In some embodiments, the steps further include: determining that that the static display condition is no longer met; loading second display data from memory; and displaying the second display data. In some embodiments, the steps further include loading the first display data from memory.

When a display is in a static screen state, the display still needs to be refreshed periodically. The display is considered to be in a static screen state when the display presents a static, unchanging image for some period of time. Typically, to refresh the display, display data is loaded from memory by a display controller and presented on the display. Where a memory subsystem is in an idle, low power state due to system or user inactivity, the memory subsystem must be awoken in order to load the display data. The rate at which the memory subsystem is woken and the display data loaded depends on the resolution of the display, the refresh rate of the display, the number of displays used, and the size of an on-die display buffer. The memory subsystem is one of the dominant users of system power. Large resolution displays, particularly when using multiple displays, prevents the memory subsystem from entering or staying in a low power state due to the need for periodic display refresh. Accordingly, the memory subsystem is likely to see reduced power savings afforded by entering a low power state due to the difficulty in entering or staying in the low power state.

To address the memory subsystem power consumption caused by periodic display refresh, FIG. 1 is a block diagram of a non-limiting example apparatus 100 for refreshing displays using on-die cache. The example apparatus 100 can be implemented in a variety of ways, such as a motherboard of a computing device or as a graphics processing unit (GPU). Accordingly, the apparatus 100 can be operatively coupled to a variety of other components or devices and implemented in various devices or systems, including computing devices such as mobile devices, personal computers, peripheral hardware components, gaming devices, set-top boxes, and the like. The apparatus 100 can also be implemented as multiple operative components in a same system, such as the computing devices described above.

The apparatus 100 includes a processor 102. The processor 102 is a die including various integrated circuit, functional, and logical components. For example, in some embodiments, the processor 102 includes a central processing unit (CPU). In other embodiments, the processor 102 includes a processor 102 of a hardware accelerator such as a GPU or another component. In some embodiments, the processor 102 includes a system-on-a-chip.

The processor 102 includes a display controller 104. The display controller 104 includes one or more integrated circuits or logical components that generate a video signal for output to a display 106. For example, the display controller 104 generates a video signal based on display data encoding an image or frame to be displayed. To do so, the display controller 104 loads a portion of the display data into a display buffer 108 and generates a video signal for the display 106 based on portions of display data 107 in the display buffer 108. The display buffer 108 is a dedicated portion of memory (e.g., on-die memory) into which portions of display data 107 are loaded for encoding as a video signal. Accordingly, to generate a single frame or refresh of the display, in some embodiments, portions of the display data 107 must be repeatedly loaded into the display buffer 108, overwriting previously loaded portions of the display data 107. Although the display controller 104 and display buffer 108 are shown as components of the processor 102, it is understood that, in some embodiments, the apparatus 100 includes display controllers 104 and display buffers 108 separate from the processor 102 (e.g., as separate components of a motherboard or other component operatively coupling the processor 102 to the display controller 104 and display buffer 108).

The apparatus 100 also includes a memory subsystem 110. The memory subsystem 110 includes the functional components for storing data in memory. For example, the memory subsystem 110 includes one or more memory controllers 112. The memory controllers 112 perform received read and write operations on memory modules 114. The memory controllers 112 also refresh memory modules 114 as necessary in order to maintain data integrity. The memory modules 114 are random access memory (RAM), including Dynamic Random Access Memory (DRAM) or other types of RAM as can be appreciated.

Returning to the processor 102, the processor 102 also includes cache 116. The cache 116 is on-chip or on-die memory for storing data, enabling fast access by the processor 102. Accordingly, the data stored in the cache 116 frequently mirrors data stored in the memory modules 114. In some embodiments, the cache 116 includes last-level cache (LLC) memory. LLC memory is the highest level of cache 116 and is shared by multiple functional units of a chip (e.g., shared by multiple functional components of the processor 102.

The processor 102 further includes a power management controller 118. The power management controller 118 is a microcontroller or logical block that governs power functions of the apparatus 100. For example, the power management controller 118 monitors power connections and battery charges, controls power to various components including the processor 102 and the memory subsystem 110, shuts down idle system components, controls the operative power modes (e.g., full power, low power) of system components, and the like. For example, as will be described in further detail below, the power management controller 118 controls whether the memory subsystem 110 is operating at a full power consumption mode or, if idle, a reduced or low power consumption mode.

To refresh the display 106 during normal operation (e.g., when the display data 107 is dynamic across frames and various clients of the cache 116 are active), the display controller 104 loads display data 107 from the memory modules 114. For example, the display data 107 is generated by an operating system 120 according to various executed operations or applications and stored in the memory modules 114. The display controller 104 then loads portions of the display data 107 from the memory modules 114 into the display buffer 108 and generates a video signal based on the buffered display data 107 for output to the display 106.

The apparatus 100 determines whether a static display condition has been met. A static display condition is met when the display data 107 to be displayed over time is a static (e.g., unchanging) image. Accordingly, determining whether a static display condition has been met includes determining that a static image is to be displayed. For example, in some embodiments, determining that a static image is to be displayed includes determining that a mouse, cursor, or other user interface element is idle. Determining that the user interface element is idle includes determining that no input is received from a mouse, keyboard, or other input device over some period of time (e.g., within a time window or threshold). In some embodiments, determining that a static image is to be displayed includes determining that one or more multimedia or graphics clients (e.g., video players, games, and the like) are not being executed, are idle or are not rendering any display data 107. As no clients are rendering changing display data 107 and as no user interface elements are changing, the display data 107 will reflect a static image.

As the approaches described herein rely on the use of on-die cache 116, in some embodiments, determining that a static display condition has been met also includes determining that one or more clients of the memory subsystem 100 are idle. A client of the memory subsystem 110 is any software or hardware component capable of accessing the memory subsystem 110 to facilitate its operations. Accordingly, such clients include graphics processes, multimedia processes (e.g., encode or decode engines), or any other client as can be appreciated.

In some embodiments, determining that the static display condition is met is performed by the operating system 120. For example, the operating system 120 monitors input devices to determine that cursors, mouse pointers, or other user interface elements are not changing or moving. As another example, the operating system 120 monitors active processes or services being executed to determine whether the clients of the cache 116 are idle. Accordingly, in some embodiments, in response to determining that the static display condition is met, the operating system 120 generates a signal or other indication to the processor 102 that the static display condition is met.

The display controller 104 then (e.g., in response to the indication from the operating system 120 that the static display condition is met) loads display data 107 from the memory modules 114. The loaded display data 107 corresponds to a static image to be displayed on the display 106. The display controller 104 then stores the display data 107 in the cache 116 (e.g., in LLC memory). As the clients of the cache 116 are idle, and therefore not actively accessing the cache 116, storing the display data 107 in the cache 116 will not interfere with the operation of any clients of the cache 116. The display controller 104 then displays the display data 107 from the cache 116. For example, the display controller 104 generates video signals based on the display data 107 stored in the cache 116.

As described above, the display data 107 being presented by the display controller 104 is loaded from cache 116. Thus, the memory subsystem 110 need not be in an active or awake state for the display controller 104 to load display data 107 from the memory modules 114. Accordingly, in some embodiments, in response to the indication from the operating system 120 that the static display condition has been met, the power management controller 118 causes the memory subsystem 110 to enter a reduced-power state. By entering a reduced-power state, the memory subsystem 110 consumes less power overall. For example, the power management controller 118 causes the memory subsystem 110 to enter the reduced power state in response to an indication from the display controller 104 that the display data 107 has been loaded into cache 116 from the memory modules 114.

The apparatus 100 also determines (e.g., by the operating system 120, by another process or functional component) that the static display condition is no longer met. For example, the static display condition is no longer met in response to an input to an input device such as a keyboard or mouse that causes a user interface element (e.g., a cursor or mouse pointer) to move. As another example, the static display condition is no longer met when an application, service, or other software module (e.g., multimedia software) causes updated display data 107 to be rendered. As a further example, the static display condition is no longer met when a client of the cache 116 is no longer idle. Accordingly, the display controller 104 reverts to loading display data 107 from memory modules 114 and displaying the display data 107 as loaded from the memory modules 114. Thus, clients of the cache 116 are free to use the cache 116 to perform their operations. In embodiments where the power management controller 118 caused the memory subsystem 110 to enter the reduced power state, the power management controller 118 causes the memory subsystem 110 to exit the reduced power state such that display data 107 can be loaded from the memory modules 114.

By displaying display data 107 from cache 116 while in a static display state (e.g., while the static display condition is met), the display 106 is refreshed without the need to access the memory subsystem 110. Thus, the memory subsystem 110 is able to enter a reduced power state, reducing the overall power consumption while in the static display state. Moreover, as the size of the cache 116 tends to be comparatively large compared to display buffers 108, the cache 116 is able to store the entirety of the static display data 107, even when using multiple displays 106 and at high resolutions.

For further explanation, FIG. 2 sets forth a flow chart illustrating an exemplary method for refreshing displays using on-die cache that includes determining 202 (e.g., by an apparatus 100) that a static display condition has been met. A static display condition is met when the display data 107 to be displayed over time is a static (e.g., unchanging) image. Accordingly, for a static image to be displayed, mouse pointers, cursors, or other user interface elements must remain static over time. Additionally, no multimedia, graphics, or other dynamic content is being displayed. As the static display condition has been met, the display data 107 to be displayed will remain unchanged.

The method of FIG. 2 also includes storing 204, in cache 116 memory of a processor 102, first display data 107. The first display data 107 corresponds to a static image to be displayed on the display 106. In some embodiments, storing 204 first display data 107 in the cache 116 includes loading the first display data 107 from memory (e.g., from memory modules 114). The display controller 104 then stores the display data 107 in the cache 116 (e.g., in LLC memory).

The method of FIG. 2 also includes displaying 206 the first display data 107 from the cache 116 memory. For example, the display controller 104 generates video signals based on the display data 107 stored in the cache 116. The first display data 107 continues to be displayed from the cache 116 as long as the static display condition continues to be met. Thus, attached displays 106 are able to be refreshed without accessing a memory subsystem 110.

Figure 3:
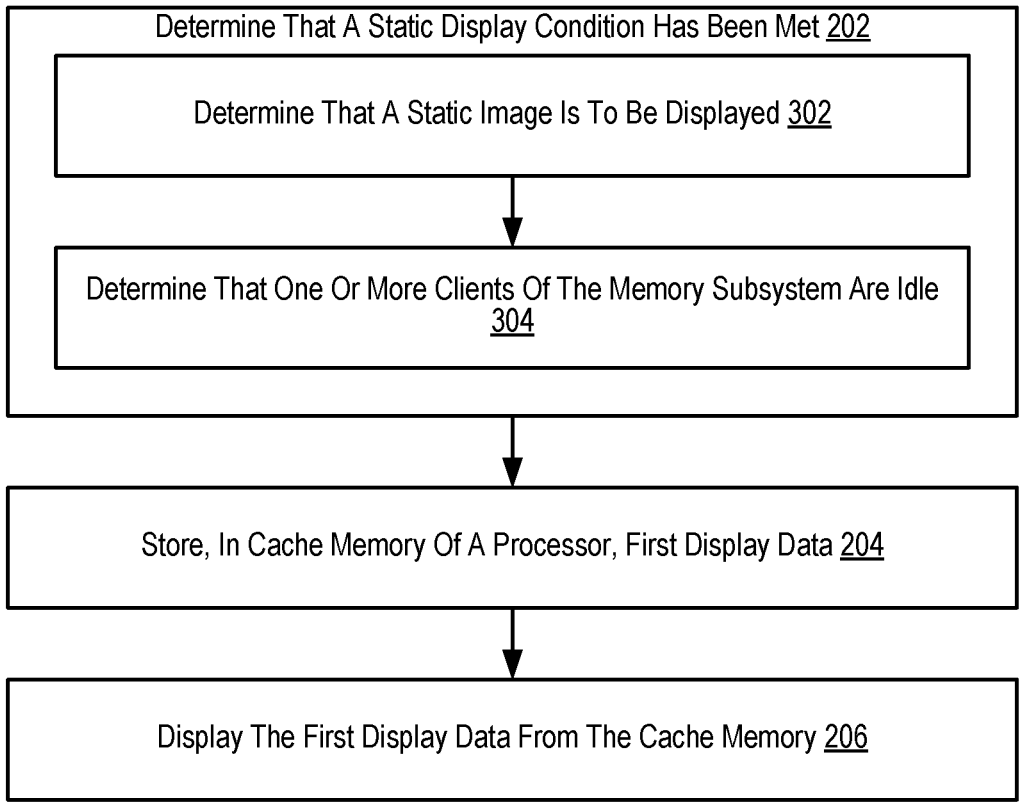
FIG. 3 is a flowchart of an example method for refreshing displays using on-die cache according to some embodiments.

For further explanation, FIG. 3 sets forth a flow chart illustrating an exemplary method for refreshing displays using on-die cache that includes determining 202 (e.g., by an apparatus 100) that a static display condition has been met; storing 204, in cache 116 memory of a processor 102, first display data 107; and displaying 206 the first display data 107 from the cache 116 memory.

FIG. 3 differs from FIG. 2 in that determining 202 that a static display condition has been met includes determining 302 that a static image is to be displayed. For example, in some embodiments, determining that a static image is to be displayed includes determining that a mouse, cursor, or other user interface element is idle. Determining that the user interface element is idle includes determining that no input is received from a mouse, keyboard, or other input device over some period of time (e.g., within a time window or threshold). In some embodiments, determining that a static image is to be displayed includes determining that one or more multimedia or graphics clients (e.g., video players, games, and the like) are not being executed, are idle or are not rendering any display data 107. As no clients are rendering changing display data 107 and as no user interface elements are changing, the display data 107 will reflect a static image.

FIG. 3 further differs from FIG. 2 in that determining 202 that a static display condition has been met includes determining 304 that one or more clients of the memory subsystem 110 memory are idle. A client of the memory subsystem 110 is any software or hardware component capable of accessing the memory subsystem 110 to facilitate its operations. Accordingly, such clients include graphics processes, multimedia processes (e.g., encode or decode engines), or any other client as can be appreciated. As such clients are idle, the memory subsystem 110 is able to enter a reduced power state, providing for improved power savings.

Figure 4:
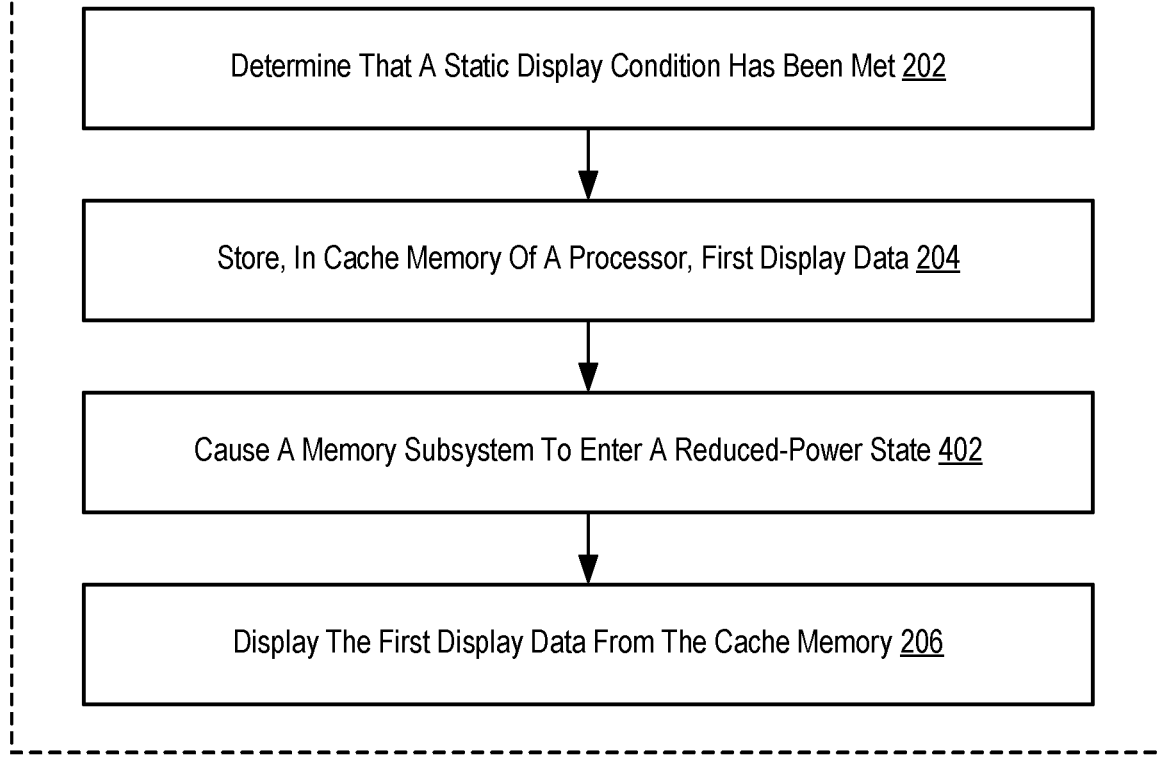
FIG. 4 is a flowchart of an example method for refreshing displays using on-die cache according to some embodiments.

For further explanation, FIG. 4 sets forth a flow chart illustrating an exemplary method for refreshing displays using on-die cache that includes determining 202 (e.g., by an apparatus 100) that a static display condition has been met; storing 204, in cache 116 memory of a processor 102, first display data 107; and displaying 206 the first display data 107 from the cache 116 memory.

FIG. 4 differs from FIG. 2 in that the method of FIG. 4 includes causing 402 a memory subsystem 110 to enter a reduced-power state. As described above, the first display data 107 being presented by the display controller 104 is loaded from cache 116. Thus, the memory subsystem 110 need not be in an active or awake state for the display controller 104 to load first display data 107 from the memory modules 114. By entering a reduced-power state, the memory subsystem 110 consumes less power overall. For example, the power management controller 118 causes the memory subsystem 110 to enter the reduced power state in response to an indication from the display controller 104 that the first display data 107 has been loaded into cache 116 from the memory modules 114.

Figure 5:
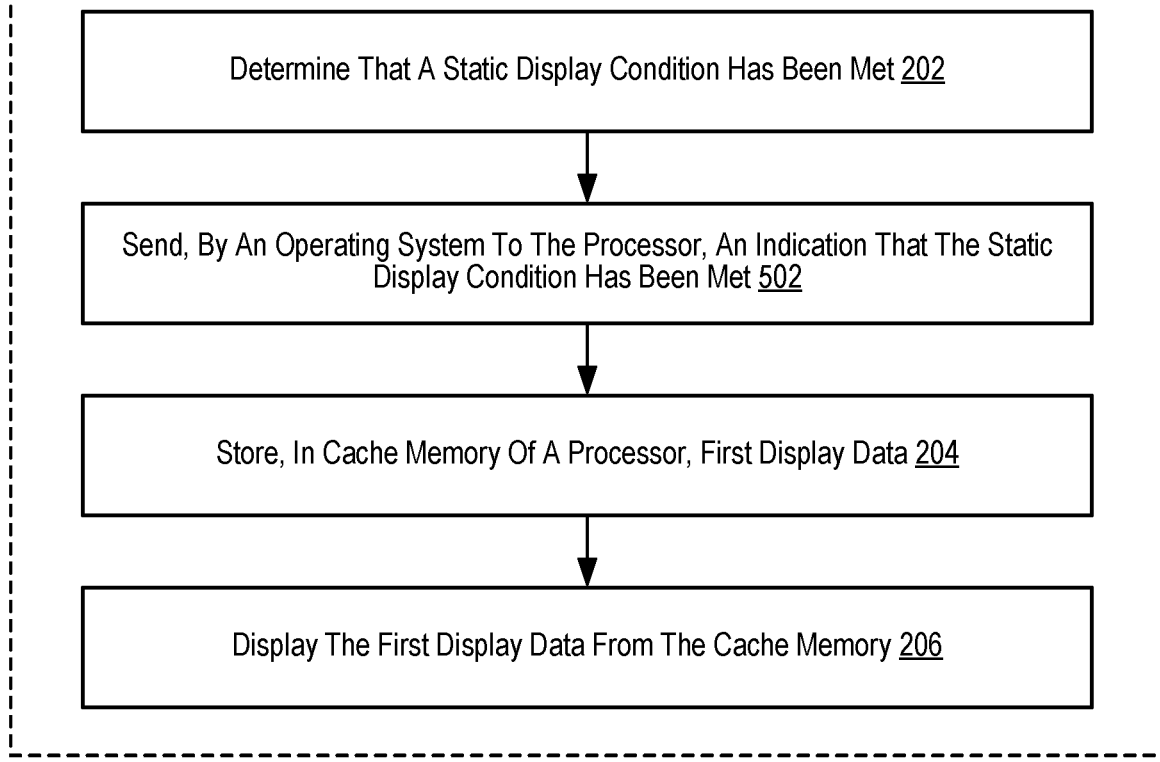
FIG. 5 is a flowchart of an example method for refreshing displays using on-die cache according to some embodiments.

For further explanation, FIG. 5 sets forth a flow chart illustrating an exemplary method for refreshing displays using on-die cache that includes determining 202 (e.g., by an apparatus 100) that a static display condition has been met; storing 204, in cache 116 memory of a processor 102, first display data 107; and displaying 206 the first display data 107 from the cache 116 memory.

FIG. 5 differs from FIG. 2 in that the method of FIG. 5 includes sending 502, by an operating system 120 to the processor 102, an indication that the static display condition has been met. In some embodiments, determining 202 that the static display condition is met is performed by the operating system 120. For example, the operating system 120 monitors input devices to determine that cursors, mouse pointers, or other user interface elements are not changing or moving. As another example, the operating system 120 monitors active processes or services being executed to determine whether the clients of the cache 116 are idle. Accordingly, in some embodiments, in response to determining that the static display condition is met, the operating system 120 generates a signal or other indication to the processor 102 that the static display condition is met.

Figure 6:
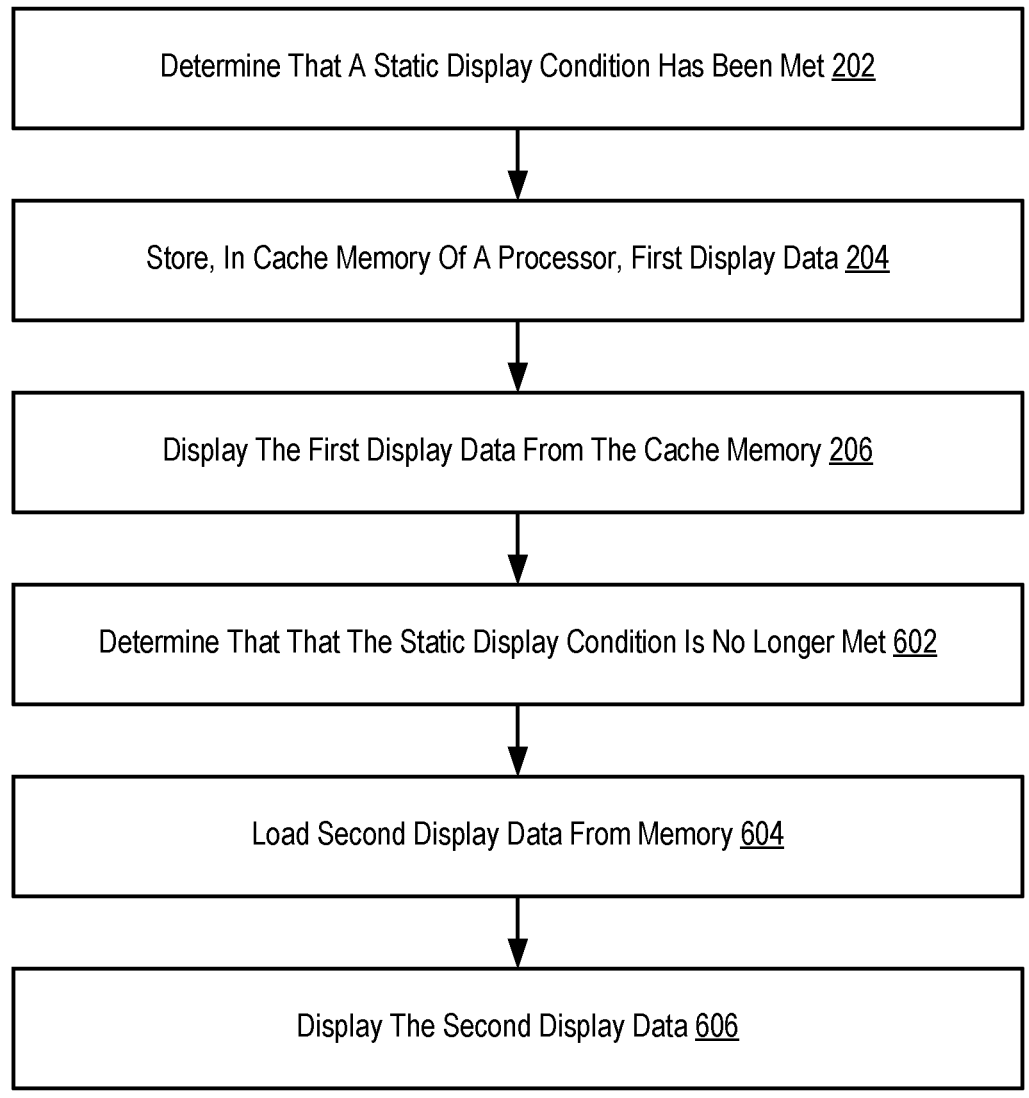
FIG. 6 is a flowchart of an example method for refreshing displays using on-die cache according to some embodiments.

For further explanation, FIG. 6 sets forth a flow chart illustrating an exemplary method for refreshing displays using on-die cache that includes determining 202 (e.g., by an apparatus 100) that a static display condition has been met; storing 204, in cache 116 memory of a processor 102, first display data 107; and displaying 206 the first display data 107 from the cache 116 memory.

FIG. 6 differs from FIG. 2 in that the method of FIG. 6 determining 602 that the static display condition is no longer met. For example, the static display condition is no longer met in response to an input to an input device such as a keyboard or mouse that causes a user interface element (e.g., a cursor or mouse pointer) to move. As another example, the static display condition is no longer met when an application, service, or other software module (e.g., multimedia software) causes updated second display data 107 to be rendered. As a further example, the static display condition is no longer met when a client of the cache 116 is no longer idle.

The method of FIG. 6 also includes loading 604 second display data 107 from memory (e.g., from memory modules 114). In embodiments where the power management controller 118 caused the memory subsystem 110 to enter the reduced power state, loading 604 the second display data 107 from memory includes causing the memory subsystem 110 to exit the reduced power state (e.g., "waking" the memory subsystem 110). The second display data 107 is loaded from memory into a display buffer 108. The method of FIG. 6 also includes displaying 606 the second display data 107. For example, the display controller 104 generates a video signal based on second display data 107 stored in the display buffer 108. Thus, while the static display condition is not met, display data 107 loaded from memory is used to refresh the display 106.

In view of the explanations set forth above, readers will recognize that the benefits of refreshing displays using on-die cache include:

Improved performance of a computing system reducing power usage during idle static screen scenarios by ensuring that displays are able to be refreshed without accessing or waking a memory subsystem.

Exemplary embodiments of the present disclosure are described largely in the context of a fully functional computer system for refreshing displays using on-die cache. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of refreshing displays using on-die cache, the method comprising:
    determining that a static display condition has been met;
    storing, in cache memory of a processor, responsive to determining that the static display condition has been met, first display data;
    receiving an indication from a display controller that the first display data has been stored in the cache memory;
    causing, responsive to receiving the indication, a memory subsystem to enter a reduced-power state; and
    displaying the first display data from the cache memory.

2. The method of claim 1, wherein determining that the static display condition has been met comprises:
    determining that a static image is to be displayed; and
    determining that one or more clients of a memory subsystem are idle.

3. The method of claim 1, wherein the cache memory comprises last level cache (LLC) memory.

4. The method of claim 1, wherein determining that the static display condition has been met is performed by an operating system, and the method further comprises sending, by the operating system to the processor, an indication that the static display condition has been met.

5. The method of claim 1, further comprising:
   determining that the static display condition is no longer met;
   loading second display data from memory; and
   displaying the second display data.

6. The method of claim 1, further comprising loading the first display data from memory.

7. The method of claim 1, wherein the display controller is included within the processor.

8. An apparatus for refreshing displays using on-die cache, the apparatus comprising:
   a processor; and
   memory operatively coupled to the processor, the memory comprising computer program instructions that when executed by the processor are configured to:
      determine that a static display condition has been met;
      store, in cache memory of the processor, responsive to determining that the static display condition has been met, first display data;
      receive an indication from a display controller that the first display data has been stored in the cache memory;
      cause, responsive to receiving the indication, a memory subsystem to enter a reduced-power state; and
      display the first display data from the cache memory.

9. The apparatus of claim 8, wherein determining that the static display condition has been met comprises:
   determining that a static image is to be displayed; and
   determining that one or more clients of a memory subsystem are idle.

10. The apparatus of claim 8, wherein the cache memory comprises last level cache (LLC) memory.

11. The apparatus of claim 8, wherein determining that the static display condition has been met is performed by an operating system, and the apparatus further comprises computer program instructions that when executed are configured to send, by the operating system to the processor, an indication that the static display condition has been met.

12. The apparatus of claim 8, further comprising computer program instructions that when executed by the processor are configured to:
   determine that the static display condition is no longer met;
   load second display data from memory; and
   display the second display data.

13. The apparatus of claim 8, further comprising computer program instructions that when executed by the processor are configured to load the first display data from memory.

14. The apparatus of claim 8, wherein the display controller is included within the processor.

15. A computer program product disposed upon a non-transitory computer readable medium, the computer program product comprising computer program instructions for refreshing displays using on-die cache that, when executed, cause a computer system to:
   determine that a static display condition has been met;
   store, in cache memory of a processor, responsive to determining that the static display condition has been met, first display data;
   receive an indication from a display controller that the first display data has been stored in the cache memory;
   cause, responsive to receiving the indication, a memory subsystem to enter a reduced-power state; and
   display the first display data from the cache memory.

16. The computer program product of claim 15, wherein determining that the static display condition has been met comprises:
   determining that a static image is to be displayed; and
   determining that one or more clients of a memory subsystem are idle.

17. The computer program product of claim 15, wherein the cache memory comprises last level cache (LLC) memory.

18. The computer program product of claim 15, wherein determining that the static display condition has been met is performed by an operating system, and the computer program product further comprises computer program instructions that, when executed, send, by the operating system to the processor, an indication that the static display condition has been met.

19. The computer program product of claim 15, further comprising computer program instructions that, when executed:
   determine that the static display condition is no longer met;
   load second display data from memory; and
   display the second display data.

20. The computer program product of claim 15, wherein the display controller is included within the processor.

* * * * *